No. 627,938. Patented June 27, 1899.
W. LONG, JR.
NUT LOCK.
(Application filed Sept. 27, 1898.)
(No Model.)

Attest
N. P. Smith
Maude Griffin

Inventor:
William Long, Jr.
By Higdon & Longan
Atty's.

THE NORRIS PETERS CO., PHOTO-LITHO., WASHINGTON, D. C.

UNITED STATES PATENT OFFICE.

WILLIAM LONG, JR., OF NEW FRANKLIN, MISSOURI.

NUT-LOCK.

SPECIFICATION forming part of Letters Patent No. 627,938, dated June 27, 1899.

Application filed September 27, 1898. Serial No. 692,043. (No model.)

*To all whom it may concern:*

Be it known that I, WILLIAM LONG, Jr., of the city of New Franklin, Howard county, State of Missouri, have invented certain new and useful Improvements in Nut-Locks, of which the following is a full, clear, and exact description, reference being had to the accompanying drawings, forming a part hereof.

My invention relates to nut-locks; and it consists of the novel construction, combination, and arrangement of parts hereinafter shown, described, and claimed.

Figure 1:
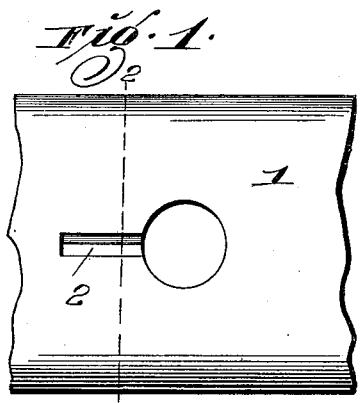
Figure 2:
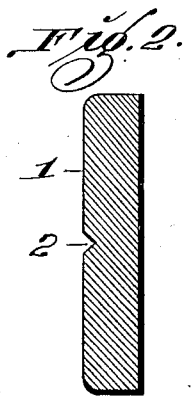
Figure 3:
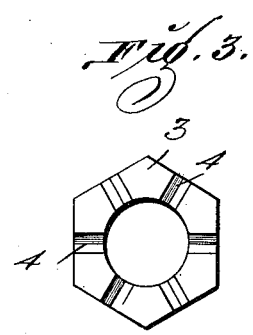
Figure 4:
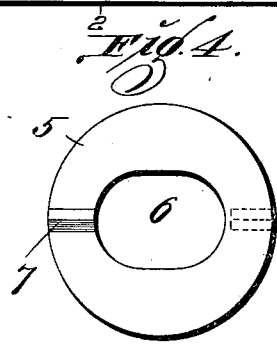
Figure 5:
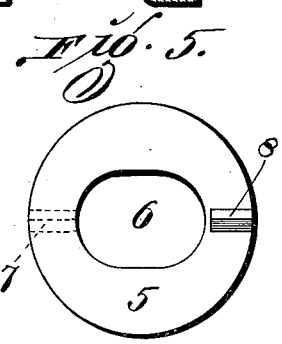
Figure 6:
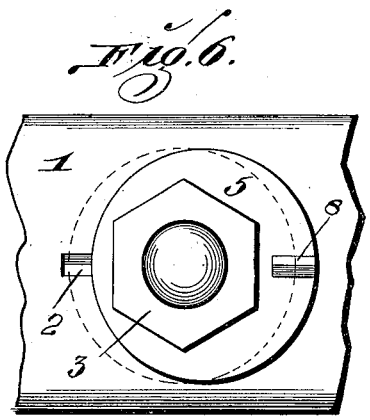
Figure 7:
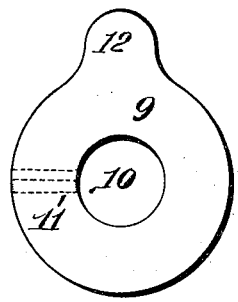
Figure 8:
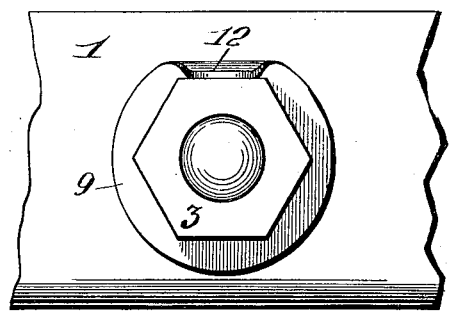

Figure 1 is a front elevation of a section of a fish-plate constructed to receive my improved nut-lock. Fig. 2 is a vertical sectional view taken approximately on the line 2 2 of Fig. 1. Fig. 3 is an elevation of the inside face of the nut made use of in carrying out my invention. Figs. 4 and 5 are obverse and reverse elevations of the washer of which I make use. Fig. 6 is a side elevation of a section of the fish-plate, together with the nut and washer thereon. Fig. 7 is an elevation of a modified form of the washer made use of in carrying out my invention. Fig. 8 is an elevation showing this form of the washer in position to engage a nut.

In the construction of my improved nut-lock the fish-plate 1 or other object against which the nut engages is provided adjacent each bolt-hole with a horizontally-arranged groove 2, and formed on the inner face of the nut 3 is a plurality of radially-arranged V-shaped grooves 4. The washer 5 is provided with an elongated aperture 6, and formed integral with the face of the washer that is intended to engage against the face of the fish-plate is a horizontally-arranged V-shaped lug 7, approximately half as long as is the V-shaped groove 2 in the fish-plate 1, and said lug 7 is intended to seat in said groove. Upon the opposite face of the washer and at the opposite end of the aperture 6 from the lug 7 is a V-shaped lug 8, which is intended to engage in any one of the V-shaped grooves 4 of the nut 3.

In the modification shown in Figs. 7 and 8 the washer 9 is provided with a circular aperture 10, and upon its inner face is formed a V-shaped lug 11, corresponding to the lug 7, previously described, and a lip 12 is formed integral with the periphery of the washer 9, the material of which said lip is formed being somewhat thinner than is the body of the washer in order that said lip will bend easily.

In the use of the preferred form of my improved nut-lock after the bolt has been passed through the bolt-hole the washer 5 is located upon the screw-threaded end of said bolt and moved to such a position as that the V-shaped lug 7 will engage in that portion of the groove 2 immediately adjacent the aperture in said fish-plate, after which the nut 3 is located upon the screw-threaded end of the bolt, and said nut is so manipulated as that it will tightly engage against the face of said washer. While the nut is being tightened upon the bolt, it will not strike against the V-shaped lug 7 for the reason that the washer is provided with an elongated aperture 6 and has been moved laterally, thus bringing the lug 8 out of the path of travel of the edges of said nut. The position of the various parts at this point in the operation can be readily perceived by an inspection of Fig. 6, and when the nut is finally tightened against the face of the washer 5 it is essential that one of the V-shaped grooves 4 on the inner face of said nut be brought into alinement with the lug 8.

By means of a hammer and a suitable tool the washer is forced laterally beneath the nut until the lug 7 occupies a position in the outer end of the groove 2, and this movement brings the lug 8 into one of the grooves 4. Thus the washer is locked to the fish-plate and the nut is locked upon the washer, and neither the nut nor washer can become loose until said washer is forced laterally to bring the lug 8 out of the groove 4, in which it has been seated.

In the modified construction the washer 9 is seated upon the end of the bolt, with the lug 11 in the groove 2, and after the nut has been engaged upon the screw-threaded end of the bolt and is tightened against the outer face of the washer the lip 12 is bent downwardly by means of a suitable tool, so that it engages one of the flat faces of the nut. Thus the various parts are locked together and said nut cannot be removed until the lip is bent upwardly.

My improved nut-lock is simple and inexpensive and may be advantageously used upon either a wood or metal surface.

I claim—

In a nut-lock, the combination with a plate having a groove formed adjacent the bolt-hole, of a washer having an elongated aperture, a V-shaped lug formed adjacent the aperture on the inside face of said washer, a V-shaped lug formed on the opposite face of said washer, and a nut having a radially-arranged groove formed in its inner face, substantially as specified.

In testimony whereof I affix my signature in presence of two witnesses.

WILLIAM LONG, JR.

Witnesses:
 M. P. SMITH,
 MAUDE GRIFFIN.